Nov. 5, 1957  W. G. CRAIG  2,811,769
PROCESS FOR PREPARING AN ASPHALT-BONDED GLASS FIBER MAT
Filed Aug. 10, 1954
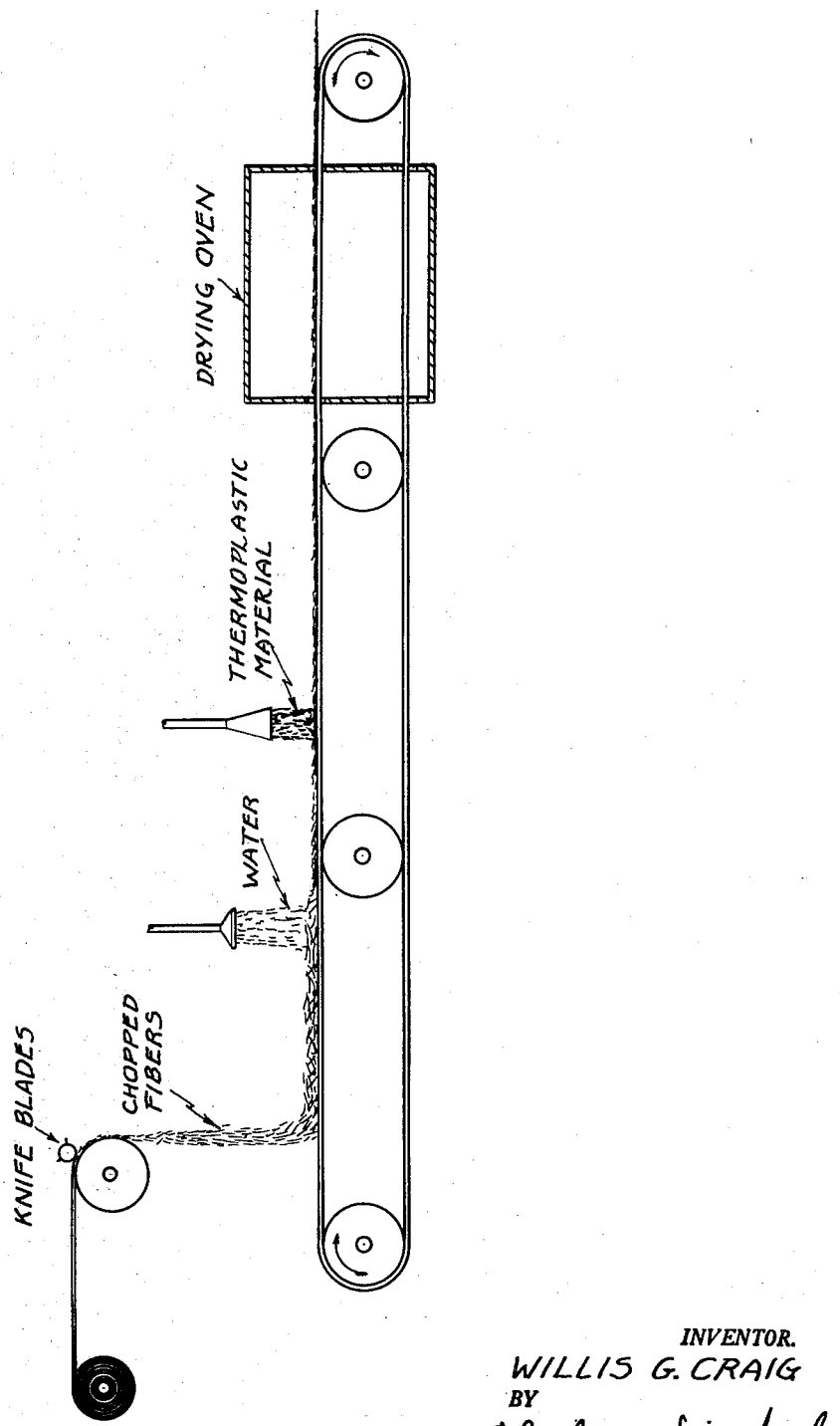
INVENTOR.
WILLIS G. CRAIG
BY
Oberlin & Limbach
ATTORNEYS.

2,811,769

PROCESS FOR PREPARING AN ASPHALT-BONDED GLASS FIBER MAT

Willis G. Craig, Willoughby, Ohio, assignor to Lubrizol Corporation, Wickliffe, Ohio, a corporation of Ohio Application August 10, 1954, Serial No. 449,022

3 Claims. (Cl. 28—72.3)

This invention relates to novel compositions containing fibers and to a method for preparing the same, and relates more particularly to such compositions which may be used in the preparation of coating compositions, plastic materials and the like.

The use of plastic materials as bonding agents for fibrous bodies is well known in the art and products of widely divergent characteristics are available from this combination of materials.

In general products which result from the impregnation or saturation of a porous fibrous material with a thermoplastic composition are solid, relatively impermeable masses. As such they offer attractive physical properties which have been exploited to a rather extensive degree. Glass fibers in particular have found wide application in such formulations. Likewise, the saturation of asbestos and organic fibrous felts with hot asphalt or "cutback" has long been known to produce widely used, moisture-impermeable roofing elements.

It is an object of the present invention to provide novel fibrous bodies bonded with thermoplastic organic materials.

It is another object of the invention to provide mats of the above type which are relatively porous and permeable to moisture vapor.

A further object of the invention is to provide a process for high speed efficient production of a uniform fibrous glass mat.

A still further object of the invention is to provide a process by which a relatively even layer of glass fibers in the form of short lengths of strands may be impregnated with a thermoplastic material so as to produce a mat of uniform thickness in which the fibers are in haphazard intermatted arrangement.

Other objects of the invention will become apparent when reference is made to the following description and the accompanying drawing in which:

Fig. 1 is a schematic illustration of the process for making the mats of the present invention.

In accordance with the principles of the invention there has been provided a novel fibrous mat containing (1) a multiplicity of strands, each composed of a plurality of fibers substantially all lying in closely associated relation with each other along their lengths in textile strand form; said strands being haphazardly arranged and distributed throughout the mat; and (2) up to 20 percent by weight of the total fiber content of monofilament fibers; said mat being reinforced and bonded throughout its structure by a thermoplastic composition; said mat being characterized by the presence of said thermoplastic composition in the intramonofilamentary spaces within the strands; said mat being further characterized in that at least 30 percent of the surface of all cross sections of the mat parallel with the faces thereof consists of voids.

Such a fibrous mat may be prepared by the process which comprises the steps of: (a) forming a relatively loosely piled mass of fibers; (b) compacting such mass by flowing water thereon; (c) depositing on the surface of such compacted mass a discontinuous layer of discrete particles of said thermoplastic material; (d) heating the thus prepared mass to drive off substantially all of the water and to fuse and coalesce said discrete particles of thermoplastic material; and (e) cooling such mass.

The above-described fibrous mat is particularly adapted for use in the preparation of roof surfaces and in this connection it may be described as a roofing element comprising an asphalt-bonded glass mat containing an average weight of glass per square foot of from 0.015 to 0.05 pound; and having a major proportion of the glass in the form of random bundles of substantially unidirectionally extending filaments having an average of at least 50 filaments per bundle. In a preferred instance, the glass mat contains asphalt in such a way as to impregnate said bundles and bond said bundles at points of contact while leaving at least 30 percent voids which extend through the mat.

The fibers referred to above may be selected from a wide variety of readily available fiber materials. Such materials include, for example, cotton, silk, wool, fortisan, ramie, flax, hemp, rayon, acetate rayon, glass, asbestos, nylon, the various acrylonitrile polymers and copolymers which have been found to possess fiber properties, polyesters such as polyethylene terephthalate, etc. Of these, glass fibers are preferred by reason of their economic availability and also because of the structural strength and stability which they impart to the fibrous mats produced by the hereindescribed process.

Short-length fibers are of especial value in this process. Such short-length fibers should, in most instances, be less than eight inches in length usually within the range of one to six inches in length and it is preferred to use fibers which are approximately 2.5 inches in length. The material from which such short-length fiber lengths are cut may be either a yarn or a strand. A yarn of glass fiber, for example, is prepared in the preferred instance by combining several strands into one linear bundle, and the strand in turn is prepared by the combination of many monofilaments into one linear bundle. The monofilaments are the products of drawing of molten glass from very small orifices in a spinneret. Short-length fibers can be prepared, of course, from any of the other "synthetic" or natural fibers and it is intended that the scope of the invention shall encompass all such short-length fibers.

The fiber strands may be pre-treated with a binding and lubricating material such as an aqueous emulsion containing dextrinized starch and vegetable oil. A pretreatment of this sort may be applied to the fibers at that point at which the monofilaments are combined into an integral strand. If strands are employed in the hereindescribed process, they may be so treated or they may be untreated. If it is intended to use yarns, the yarns may be prepared from treated or untreated strands.

The first step in the process of this invention consists in arranging the short-length fibers uniformly on a supporting surface. This may be accomplished manually as in a batch-wise operation or if a continuous process is desired, the fiber may be dropped or blown onto a moving belt. In any event, the arrangement of fibers should be essentially uniform.

The preparation of the short-length fibers and their arrangement into a mat is described in U. S. Patent No. 2,477,555 in which several methods of performing these steps are outlined. Any of these methods will be found to be substantially satisfactory. Preferably the short-length fibers are prepared by passing a continuous strand between two rollers which are revolving in opposite directions. The strand is cut by blades spaced circumferentially on one of the rollers, so that approximately equal lengths of fibers are obtained. As the fiber is cut, the resulting small pieces drop onto a moving belt and thus form a relatively uniform mat.

The above fibrous mass is treated with water in sufficient quantity to compact or felt the fibers. Only a small amount of water is required for this felting step although an excessive amount is not harmful. A given amount of water will be sufficient to felt an equal amount of fibrous material. This compacting or felting phenomenon appears to be associated with the wetting of the surface area of the fibers.

Immediately after the mass has been thus felted and while it is still wet, it is treated uniformly with a thermoplastic material. This thermoplastic material may be selected from such materials as asphalt, polystyrene, shellac, Celluloid, cellulose acetate, polyvinyl acetate, nylon, polyesters, and in fact from a wide variety of other linear polymeric materials. The treatment usually will consist in directing a fine spray of the molten thermoplastic material at the felted fibrous mat, although the scope of the invention contemplates likewise a variation whereby a cold granlar thermoplastic material is dusted onto the felted fibrous mat. It is an important feature of the hereindescribed process that, regardless of the physical state of the theremoplastic material it must be distributed uinformly over the top surface of the mat. The amount of such thermoplastic material which is so distributed on the mat will vary from 20 to 200 percent of the weight of fibrous material.

In some instances the thermoplastic material may be an uncured polymer which is distributed throughout the surface area of a fibrous mat which contains a suitable curing agent.

The use of a molten thermoplastic material affords an obvious economic advantage over the use of corresponding emulsions or dispersions of the same material.

The fibrous mat next is heated so as to evaporate the water therefrom. This step of heating has the additional effect of melting the thermoplastic material to such a consistency that as the water is evaporated from the interstices of the mat the melted thermoplastic material appears to be absorbed into these interstices. The temperature at which this heating step is performed is such that the water will be evaporated from the mat within a reasonable length of time, and while any temperature above about 200° F., under atmospheric pressure, is satisfactory, for reasons of time it is preferred to ultilize a higher temperature; i. e., of the order of 300°–1000° F.

A preferred embodiment of the process of this invention involves the use of short lengths of glass fiber strands which are prepared by the combination of 50–300 monofilaments into single linear groups. The use of such fibrous material results in a bonded mat in which the bonding agent actually appears to be absorbed into the individual strands; i. e., in the intra-monofilament spaces within each particular strand. In a more particularly preferred embodiment, asphalt is used as the bonding agent in the above process.

Such bonded fibrous mats as are available from the process of this invention may be utilized in a number of applications. One particularly useful application is as a roofing material, especially for commercial roofing. Thus, when the fibrous material employed in the process is a glass fiber and the thermoplastic material is asphalt, a very good roofing material is obtained. Likewise, the process is adaptable to the manufacture of sheets which may be combined and molded under pressure to yield objects which have sharp edges or corners.

Other modes of applying the principle of the invention may be employed, change being made as regards the details described, provided the features stated in any of the following claims, or the equivalent of such, be employed.

I therefore particularly point out and distinctly claim as my invention:

1. The process for preparing an asphalt-bonded glass fibrous mat which comprises forming a relatively loosely piled mass of glass fiber strands which are from about 1 to about 6 inches long and which are haphazardly arranged and distributed throughout the mass, compacting said mass by flowing water thereon, spraying melted asphalt on said compacted mass, heating said mass so as to drive off substantially all of the water and to remelt said asphalt causing it to impregnate said strands and bond said strands at points of contact, and then allowing said mass to cool.

2. The process for preparing an asphalt-bonded glass fibrous mat which comprises forming a relatively loosely piled mass of glass fiber strands which are from about 1 to about 6 inches long and which are haphazardly arranged and distributed throughout the mass, compacting said mass by flowing water thereon, spraying melted asphalt on said compacted mass, heating said mass to a temperature from about 200° F. to about 1000° F. so as to drive off substantially all of the water and to remelt said asphalt causing it to impregnate said strands and bond said strands at points of contact, and then allowing said mass to cool.

3. The process for preparing an asphalt-bonded glass fibrous mat which comprises forming a relatively loosely piled mass of glass fiber strands which are about 3 inches long and which are haphazardly arranged and distributed throughout the mass, compacting said mass by flowing water thereon, spraying melted asphalt on said compacted mass, heating said mass so as to drive off substantially all of the water and to remelt said asphalt causing it to impregnate said strands and bond said strands at points of contact, and then allowing said mass to cool.

References Cited in the file of this patent

UNITED STATES PATENTS

| Number | Name | Date |
|---|---|---|
| 2,305,516 | Coss et al. | Dec. 15, 1943 |
| 2,331,146 | Slayter | Oct. 5, 1943 |
| 2,372,433 | Koon | Mar. 27, 1945 |
| 2,457,784 | Slayter | Dec. 28, 1948 |
| 2,477,555 | Roberts | July 26, 1949 |
| 2,550,465 | Gorski | Apr. 24, 1951 |
| 2,569,169 | Heritage | Sept. 25, 1951 |
| 2,695,257 | Castellani | Nov. 23, 1954 |
| 2,702,069 | Lannan | Feb. 15, 1955 |